United States Patent
Rodrigues et al.

(10) Patent No.: US 12,060,010 B2
(45) Date of Patent: *Aug. 13, 2024

(54) DUAL-SIDED DISPLAY FOR A VEHICLE

(71) Applicant: Toyota Motor Engineering & Manufacturing North America, Inc., Plano, TX (US)

(72) Inventors: Sean P. Rodrigues, Ann Arbor, MI (US); Hiroshi Ukegawa, South Lyon, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 156 days.

This patent is subject to a terminal disclaimer.

(21) Appl. No.: 17/348,126

(22) Filed: Jun. 15, 2021

(65) Prior Publication Data

US 2022/0396205 A1    Dec. 15, 2022

(51) Int. Cl.
  *B60R 1/25*    (2022.01)
  *B60R 1/08*    (2006.01)
  (Continued)

(52) U.S. Cl.
  CPC ............... *B60R 1/25* (2022.01); *B60R 1/081* (2013.01); *B60W 50/14* (2013.01);
  (Continued)

(58) Field of Classification Search
  CPC ...... B60K 2370/1529; B60K 2370/178; B60K 2370/1868; B60K 2370/193;
  (Continued)

(56) References Cited

U.S. PATENT DOCUMENTS 5,953,469 A    9/1999    Zhou
7,193,666 B2    3/2007    Choi et al.
(Continued)

FOREIGN PATENT DOCUMENTS

JP    H07137589 A    3/1999
KR    101737737 B1    5/2017
(Continued)

OTHER PUBLICATIONS

Firth "Creating vehicle-to-pedestrian communication using transparent window displays" Texas Instruments, Aug. 1, 2019, 6 Pages.*

(Continued)

*Primary Examiner* — Nathnael Aynalem
(74) *Attorney, Agent, or Firm* — Christopher G. Darrow; Darrow Mustafa PC

(57) ABSTRACT

A vehicle can include a window including an interior side and an exterior side. The vehicle can include a camera located on an exterior of the vehicle. The camera can be operatively positioned to capture visual data of a blind spot of an external environment of the vehicle. The vehicle can include a dual-sided transparent display forming at least a portion of the window. The vehicle can include a processor operatively connected to the camera and the dual-sided transparent display. The processor can be configured to selectively cause the dual-sided transparent display to display exterior visual information on the exterior side. The processor can be configured to selectively cause the dual-sided transparent to display interior visual information on the interior side. The interior visual information can include the visual data of the blind spot of the vehicle.

18 Claims, 7 Drawing Sheets

(51) Int. Cl.
*B60W 50/14* (2020.01)
*G02F 1/1333* (2006.01)

(52) U.S. Cl.
CPC .. *G02F 1/133342* (2021.01); *B60R 2300/105* (2013.01); *B60R 2300/202* (2013.01); *B60R 2300/802* (2013.01); *B60W 2050/146* (2013.01)

(58) Field of Classification Search
CPC .......... B60K 2370/333; B60K 2370/66; B60K 35/00; B60K 2370/173; B60Q 9/008; B60Q 1/503; B60Q 1/5035; B60Q 1/5037; B60R 2300/205; B60R 2300/802; B60R 2300/8026; B60R 2300/8033; B60R 2300/8046; B60R 2300/8066; B60R 2300/8093; B60R 2300/804; B60R 1/081; B60R 1/23; B60R 1/24; B60R 1/25; B60R 1/26; B60R 1/27; B60R 2300/105; B60R 2300/20; B60R 2300/202; B60R 2300/207; B60R 2300/50; G08G 1/166; G08G 1/167; G08G 1/005; G02F 1/133342; G02F 1/133615; G02F 1/13362; G02F 1/133345; G02F 1/133606; B60W 50/14; B60W 2050/146; G02B 6/0011; G02B 6/0013; G02B 6/0015; G02B 6/0018; G02B 6/0025; G02B 6/0026
USPC ....................... 348/148; 369/63–65
See application file for complete search history.

(56) References Cited

U.S. PATENT DOCUMENTS

| | | | |
|---|---|---|---|
| 7,542,635 | B2 | 6/2009 | Coleman |
| 8,362,992 | B2 | 1/2013 | Kuhlman et al. |
| 9,702,183 | B1 | 7/2017 | Ochiai et al. |
| 9,707,913 | B1 | 7/2017 | Ochiai et al. |
| 9,855,890 | B2 | 1/2018 | James et al. |
| 9,902,266 | B2 | 2/2018 | Pisz et al. |
| 9,969,265 | B2 | 5/2018 | Williams et al. |
| 10,065,504 | B2 | 9/2018 | Ochiai et al. |
| 10,377,303 | B2 | 8/2019 | McNew et al. |
| 10,449,898 | B2 | 10/2019 | Sherony et al. |
| 10,777,078 | B1 | 9/2020 | Murad |
| 11,089,239 | B1 | 8/2021 | Murad et al. |
| 11,513,380 | B2 | 11/2022 | Rodrigues |
| 2003/0210360 | A1* | 11/2003 | Yoshida .............. G02F 1/13362 349/96 |
| 2011/0043496 | A1 | 2/2011 | Ray Avalani |
| 2012/0162427 | A1 | 6/2012 | Lynam |
| 2012/0306940 | A1* | 12/2012 | Machida ............ G02B 27/0176 345/107 |
| 2013/0127980 | A1 | 5/2013 | Haddick et al. |
| 2014/0019005 | A1* | 1/2014 | Lee ...................... G08G 1/0962 701/301 |
| 2015/0360565 | A1 | 12/2015 | Goto et al. |
| 2016/0311323 | A1* | 10/2016 | Lee ...................... G06V 40/20 |
| 2016/0368418 | A1 | 12/2016 | Suenaga et al. |
| 2017/0043720 | A1 | 2/2017 | Shaw |
| 2017/0297496 | A1 | 10/2017 | Onaka |
| 2018/0015879 | A1 | 1/2018 | Kim |
| 2018/0022278 | A1 | 1/2018 | Parat |
| 2018/0154831 | A1 | 6/2018 | Spencer et al. |
| 2018/0156953 | A1* | 6/2018 | Li ...................... G02F 1/133528 |
| 2018/0268701 | A1* | 9/2018 | Sato ...................... B60Q 9/008 |
| 2018/0330632 | A1 | 11/2018 | Fonarov |
| 2018/0334101 | A1 | 11/2018 | Tschirhart |
| 2019/0009796 | A1 | 1/2019 | Fujii et al. |
| 2019/0302523 | A1 | 10/2019 | Okuyama |
| 2019/0315275 | A1* | 10/2019 | Kim ...................... B60R 1/00 |
| 2020/0111489 | A1 | 4/2020 | Kuramochi et al. |
| 2021/0026057 | A1* | 1/2021 | Meng ...................... G02F 1/195 |
| 2021/0039522 | A1 | 2/2021 | Bove et al. |
| 2021/0300404 | A1 | 9/2021 | Bruckmeier et al. |
| 2021/0347374 | A1 | 11/2021 | Stenneth et al. |
| 2021/0389615 | A1* | 12/2021 | Rodrigues .............. G02B 6/005 |
| 2021/0394793 | A1* | 12/2021 | Austin .................. G05D 1/0088 |
| 2022/0041105 | A1 | 2/2022 | Jochmann et al. |
| 2022/0283432 | A1* | 9/2022 | Richards .............. G02F 1/1313 |
| 2022/0396148 | A1 | 12/2022 | Rodrigues et al. |
| 2022/0397464 | A1* | 12/2022 | Rodrigues ................ G02B 5/18 |
| 2023/0004029 | A1 | 1/2023 | Rodrigues |

FOREIGN PATENT DOCUMENTS

| | | |
|---|---|---|
| TW | 202119805 A | 5/2021 |
| WO | 2019201554 A1 | 10/2019 |

OTHER PUBLICATIONS

Zhou, X. et al., "Full color waveguide liquid crystal display," Optics Letters, vol. 42, No. 18, Sep. 15, 2017, pp. 3706-3709 (4 pages).

Moynihan, T., "What Are Quantum Dots, and Why Do I Want Them in My TV?," Wired, <https://www.wired.com/2015/01/primer-quantum-dot/>, Jan. 19, 2015 (8 pages) ).

Rodrigues, S., "Dual-Sided Transparent Display Panel", U.S. Appl. No. 16/897,577, filed Jun. 10, 2020.

Li, "Understanding Waveguide: the Key Technology for Augmented Reality Near-eye Display (Part I)" found at: https://virtualrealitypop.com/understanding-waveguide-the-key-technology-for-augmented-reality-near-eye-display-part--2b16b61f4bae, Accessed Apr. 29, 2020, (Jun. 18, 2019) (10 pages).

* cited by examiner

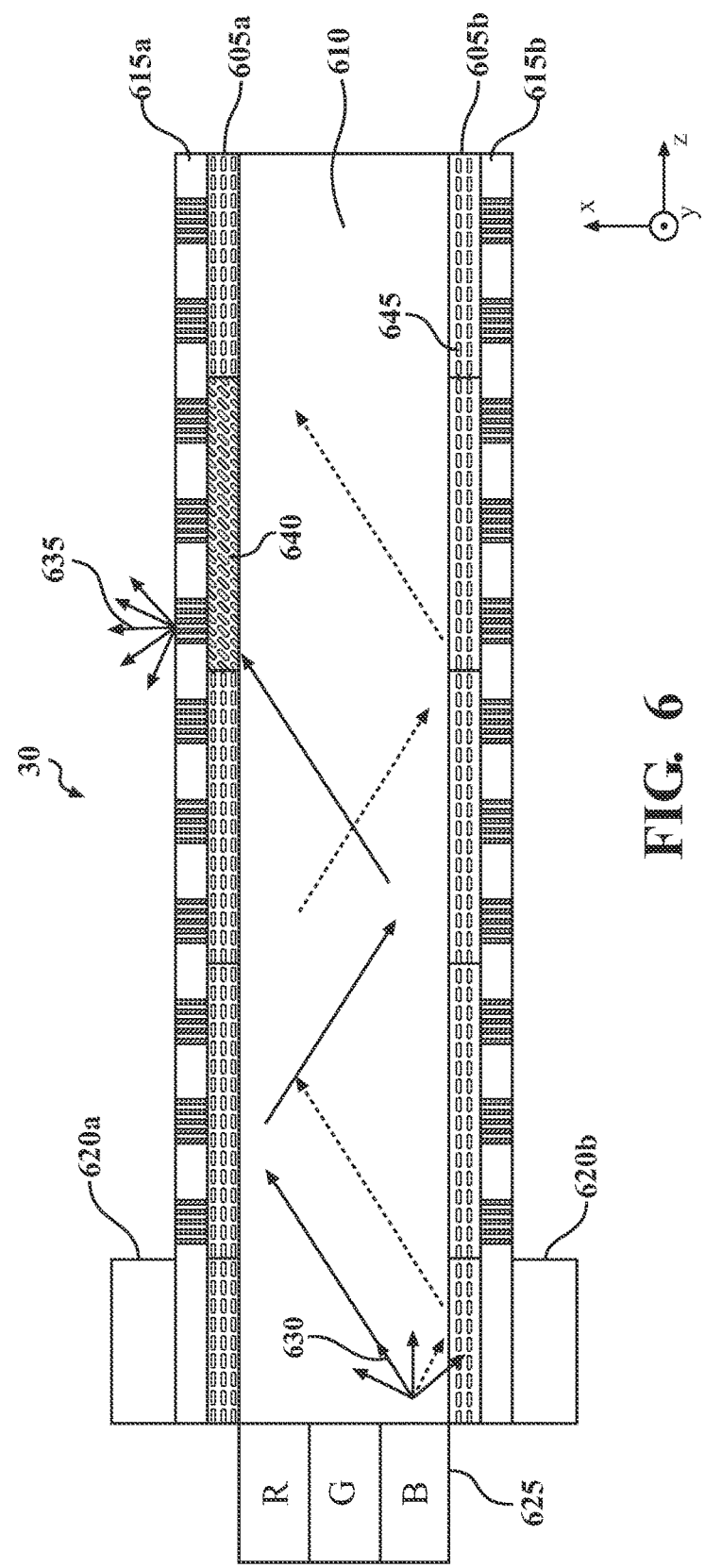

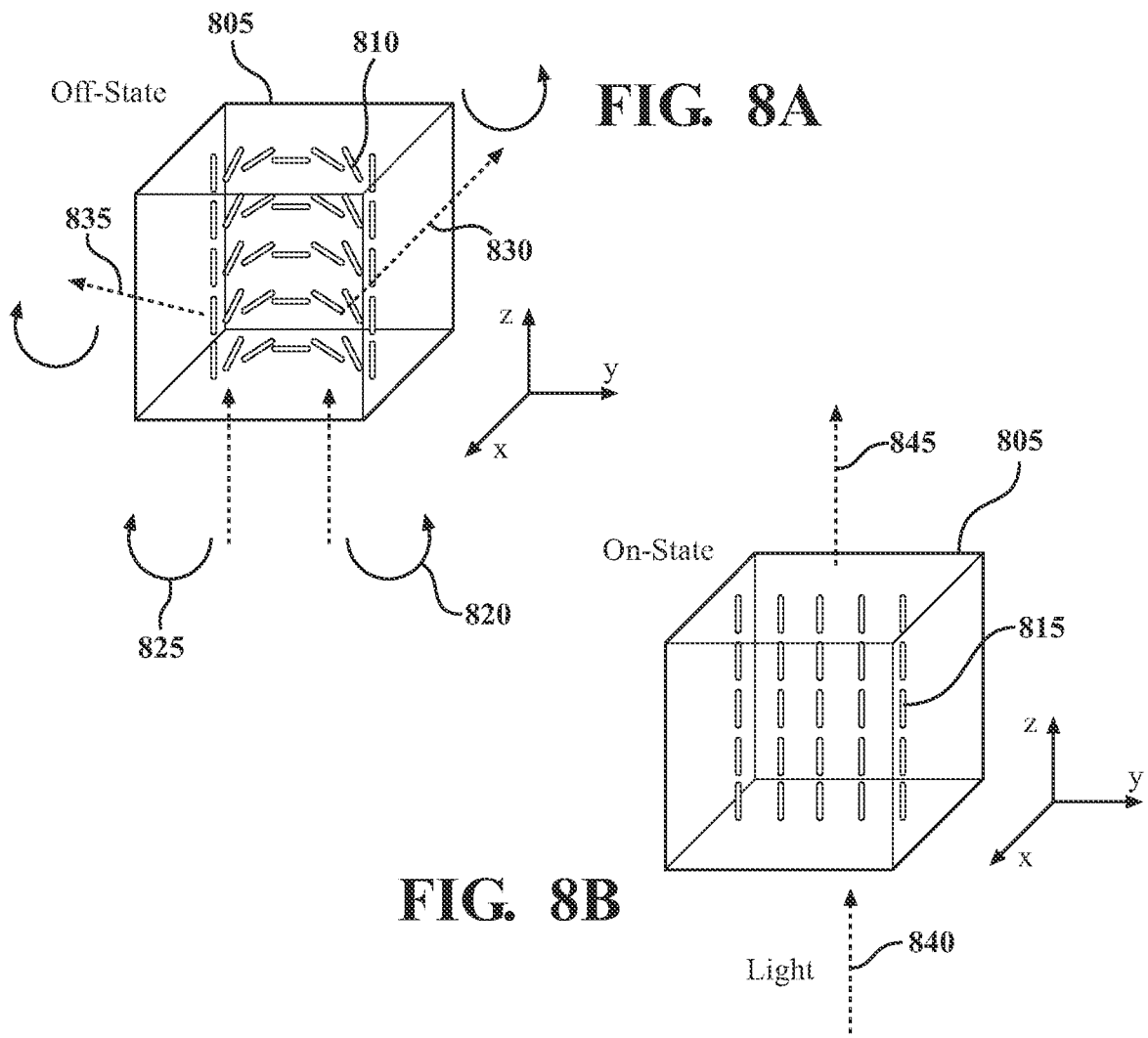
FIG. 8A
FIG. 8B
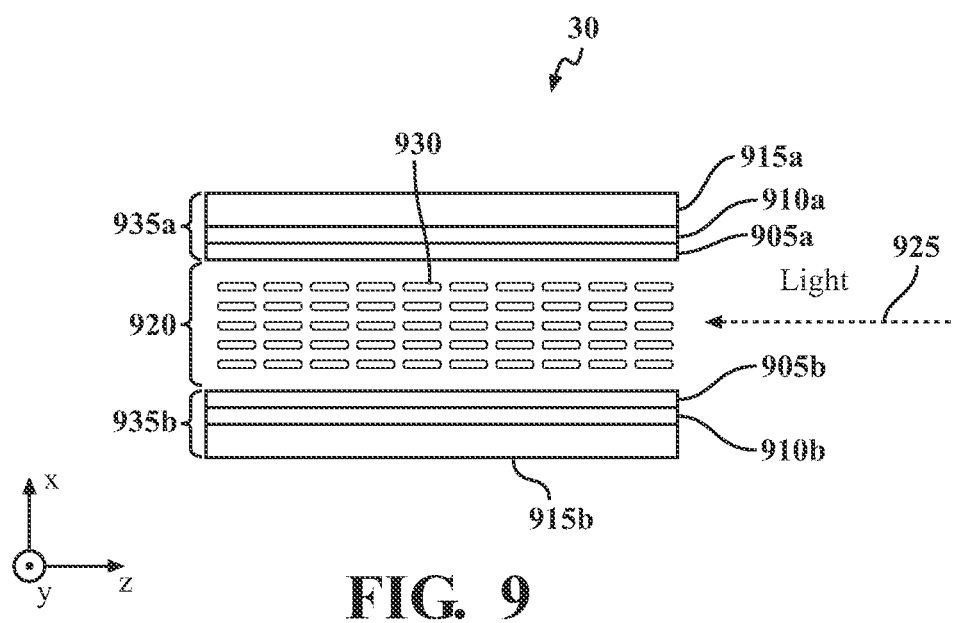
FIG. 9

US 12,060,010 B2

DUAL-SIDED DISPLAY FOR A VEHICLE

FIELD

The subject matter described herein relates in general to vehicles and, more particularly, to vehicle displays.

BACKGROUND

Some vehicles can include back-up cameras. Back-up cameras may be configured to capture visual data of the exterior environment behind the vehicle. The vehicle can include a display in an instrument panel of the vehicle. The display can be configured to display the visual data of the exterior environment behind the vehicle.

SUMMARY

In one respect, the present disclosure is directed to a vehicle. The vehicle can include a window including an interior side and an exterior side. The vehicle can include a camera operatively positioned to capture visual data of a blind spot of an external environment of the vehicle. The vehicle can include a dual-sided transparent display forming at least a portion of the window. The vehicle can include a processor operatively connected to the camera and the dual-sided transparent display. The processor can be configured to selectively cause the dual-sided transparent display to display exterior visual information on the exterior side, and selectively cause the dual-sided transparent to display interior visual information on the interior side. The interior visual information can include the visual data of the blind spot of the vehicle.

In another respect, the present disclosure is directed to a method for a vehicle. The vehicle can include a window having an interior side and an exterior side. The vehicle can include a camera operatively positioned to capture visual data of a blind spot of an external environment of the vehicle. The vehicle can include a dual-sided transparent display forming at least a portion of the window. The method can include causing exterior visual information to be displayed on the exterior side. The exterior visual information can include a blind spot warning. The method can include causing interior visual information to be displayed on the interior side. The interior visual information can include the visual data of the blind spot of the vehicle.

BRIEF DESCRIPTION OF THE DRAWINGS

FIG. 5 is an example of a method using the dual-sided display system.

FIG. 6 is an example of a first embodiment of a dual-sided transparent display that can be used in connection with the dual-sided display system.

FIGS. 8A and 8B are an example of various aspects of a third embodiment of a dual-sided transparent display that can be used in connection with the dual-sided display system.

FIG. 9 is an example of the third embodiment of a dual-sided transparent display that can be used in connection with the dual-sided display system.

DETAILED DESCRIPTION

Figure 1:
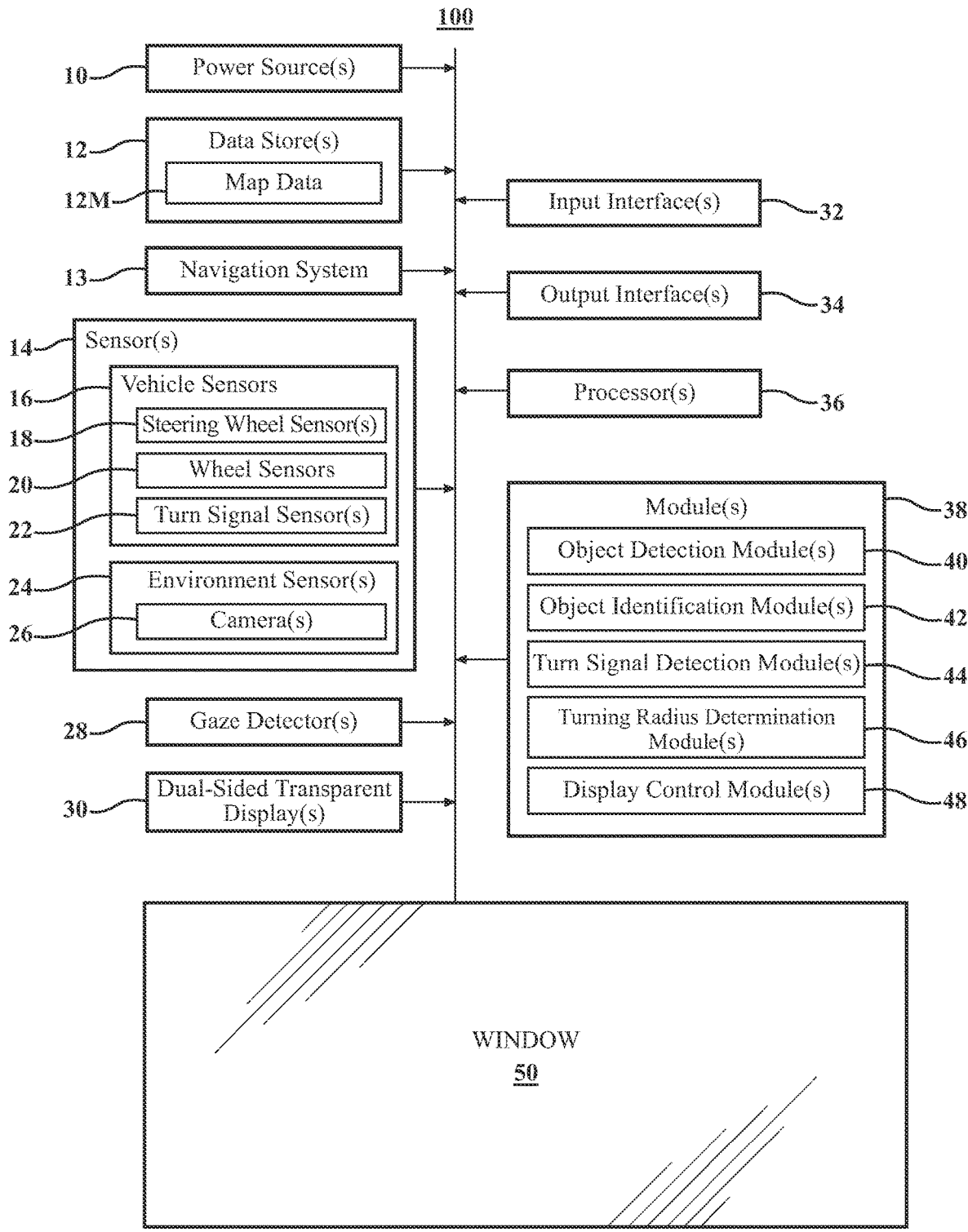
FIG. 1 is an example of a dual-sided display system for a vehicle.

In some situations, a driver of a vehicle may not be able to fully see a blind spot of the vehicle, sometimes even when the driver turns his or her head toward the blind spot. Additionally, an entity adjacent to the vehicle, such as another vehicle, a pedestrian, or a biker, may not be able to see vehicle signal of the vehicle (e.g., a turn signal) or may not know it is located in the blind spot of the vehicle. Thus, vehicle blind spots can create hazardous situations in a driving environment for both vehicle occupants and adjacent entities.

According to arrangements described herein, a dual-sided display system can be used in a vehicle to minimize blind spot hazards for both vehicle drivers and adjacent entities. The dual-sided display system can include a dual-sided transparent display forming at least a portion of a window of a vehicle. The dual-sided display system can also include a camera operatively positioned to capture visual (e.g., video) data of a blind spot of the vehicle. The dual-sided transparent display can be configured to display exterior visual information on an exterior side of the window. The exterior visual information can include a blind spot warning to display to the adjacent entity. The dual-sided transparent display can also be configured to display interior visual information on an interior side of the window. The interior visual information can include the visual data of the blind spot of the vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a dual-sided display system 100 for a vehicle is shown. The dual-sided display system 100 can include various elements. Some of the possible elements of the dual-sided display system 100 are shown in FIG. 1 and will now be described. However, it will be understood that it is not necessary for the dual-sided display system 100 to have all of the elements shown in FIG. 1 or described herein. The dual-sided display system 100 can have any combination of the various elements shown in FIG. 1. Further, the dual-sided display system 100 can have additional elements to those shown in FIG. 1. In some arrangements, the dual-sided display system 100 may not include one or more of the elements shown in FIG. 1. Further, the elements shown may be physically separated by large distances. In some arrangements, one or more of the elements shown in FIG. 1 may be located onboard a vehicle or in a remote location.

The dual-sided display system 100 can include one or more power sources 10, one or more data stores 12 including map data 12M, a navigation system 13, one or more sensors 14, including vehicle sensors 16 (one or more steering wheel sensors 18, wheel sensors 20, and/or one or more turn signal sensors 22) and environment sensors 24 (including one or more cameras 26), one or more gaze detectors 28, one or more dual-sided transparent display(s) 30, one or more input interface(s) 32, one or more output interface(s) 34, one or more processor(s) 36, one or more module(s) 38 (including one or more object detection module(s) 40, one or more object identification module(s) 42, one or more turn signal detection module(s) 44, one or more turning radius determination module(s) 46, and/or one or more display control module(s) 48), and one or more window(s) 50.

The various elements of the dual-sided display system 100 can be communicatively linked to one another or one or more other element(s) through one or more communication networks. The term "communicatively linked," as used herein, can include direct or indirect connections through a communication channel, bus, pathway, or another component or system. The term "communication network," as used herein, means one or more components designed to transmit and/or receive information from one source to another. The elements of the dual-sided display system 100 can include and/or execute suitable communication software, which enable the various elements to communicate with each other through the communication network and perform the functions disclosed herein.

The communication network(s) can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network(s) can be implemented as or include one or more wireless networks, whether short range (e.g., a local wireless network built using a Bluetooth or one of the IEEE 802 wireless communication protocols, e.g., 802.11 a/b/g/I, 802.15, 802.16, 802.10, Wi-Fi Protected Access (WPA or WPA2) or long range (e.g., a mobile, cellular, and/or satellite-based wireless network; GSM, TDMA, CDMA, WCDMA networks, or the like). The communication network(s) can include wired communication links and/or wireless communication links. The communication network(s) can include any combination of the above networks and/or other types of networks.

Figure 2:
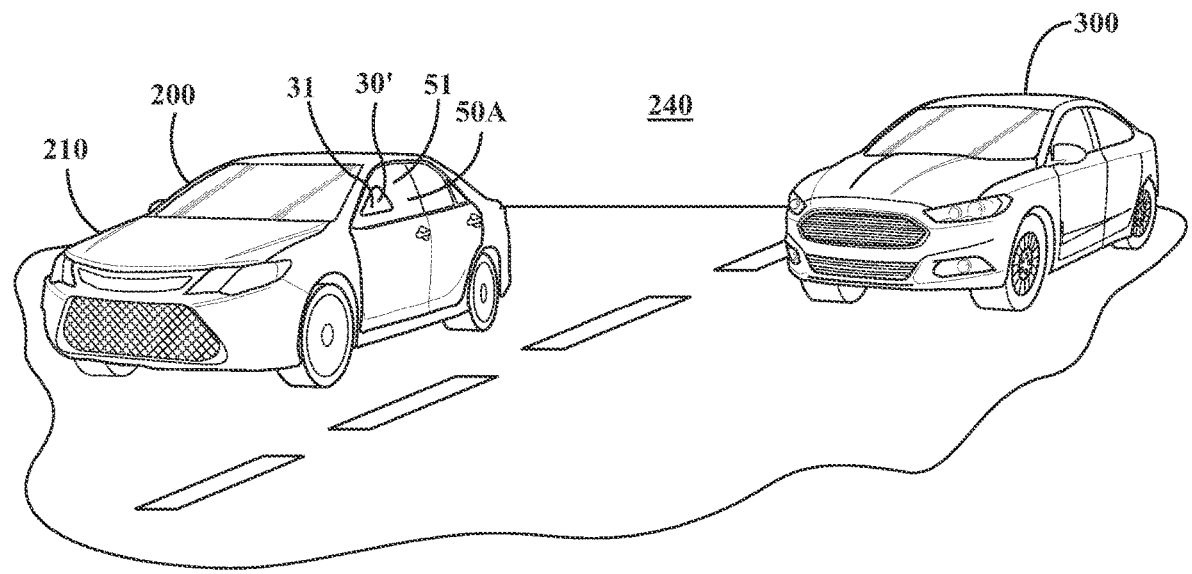
FIG. 2 is an example of a driving scenario, showing exterior visual information displayed by the dual-sided display system on an exterior side of a window of the vehicle.

The dual-sided display system 100 can be implemented in a vehicle. Referring to FIG. 2, a vehicle 200 is shown. As used herein, the term "vehicle" means any form of powered transport, now known or later developed. The vehicle 200 may be operated manually by a human driver, semi-autonomously by a mix of manual inputs from a human driver and autonomous inputs by one or more vehicle computers, fully autonomously by one or more vehicle computers (with or without a human occupant), or any combination thereof.

Moreover, the vehicle 200 can be part of a fleet of autonomous vehicles. Each of the autonomous vehicles in the fleet can include its own dual-sided display system 100 for communicating with adjacent vehicles, pedestrians, and/or bikers. The vehicle 200 can include an exterior 210 and a passenger compartment 220 (shown in FIG. 4). The passenger compartment 220 can include a dash assembly and an instrument panel. The window 50 of the dual-sided display system 100 can be a window of the vehicle 200. The window 50 can include an exterior side 50A, shown in FIGS. 2 and 3, and an interior side 50B, shown in FIG. 4. The dual-sided display system 100 can be implemented in the vehicle 200 to improve a driver's visibility of the exterior environment 240 of the vehicle 200. The exterior environment 240 of the vehicle 200 can be the driving environment of the vehicle 200, and can include the road on which the vehicle 200 is driving, adjacent roads or sidewalks, adjacent entities (e.g., vehicles, pedestrians, and bikers, and/or obstacles) near the vehicle 200. In addition to improving the driver's visibility of the exterior environment 240, the dual-sided display system 100 can be configured to communicate warnings and/or signals with an adjacent entity near the vehicle 200 and/or in the blind spot of the vehicle 200. Moreover, the dual-sided display system 100 can be configured to communicate warnings and/or signals to the driver of the vehicle 200.

Referring back to FIG. 1, the dual-sided display system 100 can include one or more power sources 10, as noted above. The power source(s) 10 can be any power source capable of and/or configured to provide sufficient power to the dual-sided display system 100 and the elements thereof. For example, the power source(s) 10 can include one or more batteries, one or more fuel cells, one or more generators, one or more alternators, one or more solar cells, and combinations thereof. In some arrangements, the power source(s) 10 can be one or more power sources of the vehicle 200.

The dual-sided display system 100 can include one or more data stores 12, as noted above. The data store(s) 12 can include volatile and/or non-volatile memory. Examples of suitable data stores include RAM (Random Access memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 12 can be a component of the processor(s) 36, or the data store(s) 12 can be operatively connected to the processor(s) 36 for use thereby. As used herein, the term "operatively connected" can include direct or indirect connections, including connections without direct physical contact. The data store(s) 12 can be configured to store map data 12M, and/or any other data and/or information from one or more elements of the dual-sided display system 100.

The map data 12M can include maps of one or more geographic areas. In some instances, the map data 12M can include information or data on roads, traffic control devices, road markings, street lights, structures, features, and/or landmarks in the one or more geographic areas. The map data 12M can include information about ramps, merging points between the ramps and the main lanes, and geo-fences surrounding the merging points. The map data 12M can be in any suitable form. In some instances, the map data 12M can include aerial views of an area. In some instances, the map data 12M can include ground views of an area, including 360 degree ground views. The map data 12M can include measurements, dimensions, distances, positions, coordinates, and/or information for one or more items included in the map data 12M and/or relative to other items included in the map data 12M. The map data 12M can include a digital map with information about road geometry. In one or more arrangements, the map data 12M can include information about the ground, terrain, roads, surfaces, and/or other features of one or more geographic areas. The map data 12M can include elevation data in the one or more geographic areas. The map data 12M can define one or more ground surfaces, which can include paved roads, unpaved roads, land, and other things that define a ground surface. The map data 12M can be high quality and/or highly detailed.

As noted above, the dual-sided display system 100 can include a navigation system 13. The navigation system 13 can include one or more mechanisms, devices, elements, components, systems, applications and/or combinations thereof, now known or later developed, configured to determine the geographic location of the vehicle 200 and/or to determine a travel route for the vehicle 200. The navigation system 13 can include one or more mapping applications to determine a travel route for the vehicle 200. The navigation system 13 can include a global positioning system, a local positioning system, or a geolocation system. In one or more arrangements, the navigation system 13 can include a global positioning system, a local positioning system or a geolocation system. The navigation system 13 can be implemented with any one of a number of satellite positioning systems, now known or later developed, including, for example, the United States Global Positioning System (GPS). Further, the navigation system 13 can use Transmission Control Protocol (TCP) and/or a Geographic information system (GIS) and location services. The navigation system 13 may include a transceiver configured to estimate a position of the vehicle 200 with respect to the Earth. For example, navigation system 13 can include a GPS transceiver to determine the vehicle's latitude, longitude and/or altitude. The navigation system 13 can use other systems (e.g. laser-based localization systems, inertial-aided GPS, and/or camera-based localization) to determine the location of the vehicle 200.

As noted above, the dual-sided display system 100 can include one or more sensors 14. The term "sensor," as used herein, can include any device, component, and/or system that can detect, determine, assess, monitor, measure, quantify, acquire, and/or sense something. The sensor(s) 14 can detect, determine, assess, monitor, measure, quantify, acquire, and/or sense in real-time. The term "real-time," as used herein, can mean a level of processing responsiveness that a user or system senses as sufficiently immediate for a particular process or determination to be made, or that enables the processor to keep up with some external process. The sensor(s) 14 can be operatively connected to the processor(s) 36, the data store(s) 12, and/or any other elements of the dual-sided display system 100. In arrangements in which the dual-sided display system 100 includes a plurality of sensors 14, the sensors 14 can work independently from each other. Alternatively, two or more of the sensors 14 can work in combination with each other. In this example, the two or more sensors 14 can form a sensor network.

The sensor(s) 14 can include any suitable type of sensor. The sensor(s) 14 can include one or more vehicle sensors 16, as noted above. The vehicle sensor(s) 16 can detect, determine, assess, monitor, measure, quantify, and/or sense information about the vehicle itself (e.g., position, orientation, speed, etc.). The vehicle sensor(s) 16 can include the steering wheel sensor(s) 18, the wheel sensors 20, and/or the turn signal sensor(s) 22. The steering wheel sensor(s) 18 can be configured to collect data and/or information about a steering wheel of the vehicle 200. For example, the steering wheel sensor(s) 18 can be configured to collect data and/or information about the position of the steering wheel, a steering wheel angle, how much the steering wheel has turned in a specific amount of time, and/or how fast the steering wheel is being turned. In some arrangements, the steering wheel sensor(s) 18 can include one or more rotary position sensors. In some instances, the wheel sensors 20 can be configured to collect data and/or information about the wheels of the vehicle 200. For example, the wheel sensors 20 can be configured to collect data and/or information about the speed the wheels are spinning, whether the wheels are being turned, and the angle at which the wheels are being turned. The turn signal sensor(s) 22 can be configured to determine whether a turn signal of the vehicle 200 is activated or deactivated. In some arrangements, the vehicle sensors 16 can be part of other systems typical of vehicles, for example, parking assist systems, lane keeping assist systems, adaptive cruise control systems, etc.

The sensor(s) 14 can also include one or more environment sensors 24. The environment sensor(s) 24 can be configured to detect, determine, assess, monitor, measure, quantify, acquire, and/or sense driving environment data. The term "driving environment data," as used herein, includes any data or information about the exterior environment 240 in which the vehicle 200 is located or one or more portions thereof. The environment sensor(s) 24 can include one or more cameras 26. The camera(s) 26 can be located on the vehicle 200 for example, positioned along one or both sides of the vehicle 200 on the exterior 210 of the vehicle 200. In some arrangements, the camera(s) 26 can be located in or on an exterior side view mirror of the vehicle 200. In other arrangements, the camera(s) 26 can be located in any other suitable location on the vehicle 200.

The camera(s) 26 can be configured to acquire visual data of a portion of the exterior environment 240 of the vehicle 200. Specifically, the camera(s) 26 can be configured to acquire visual data of at least one or more blind spots of the exterior environment 240 vehicle 200. For example, the vehicle 200 can include a camera 26 located on the exterior 210 of the vehicle 200 on the driver's side, which can be configured to acquire visual data about a blind spot on the driver's side of the vehicle 200. The vehicle 200 can also include a camera 26 located on the exterior 210 of the vehicle on the passenger's side, which can be configured to acquire visual data about a blind spot on the passenger's side of the vehicle 200. As shown in FIG. 2, the driver's side of the vehicle 200 is the left side of the vehicle 200, and the passenger's side of the vehicle 200 is the right side of the vehicle 200. However, it will be understood that in some arrangements, the driver's side of the vehicle 200 can be the right side of the vehicle 200, and the passenger's side of the vehicle 200 can be the left side of the vehicle 200. The visual data collected by the camera(s) 26 can include video and/or still images of the blind spot(s). The visual data can be acquired continuously in real-time. The camera(s) 26 can be operatively connected to the processor(s) 36. The camera(s) 26 can be any suitable camera and/or other imaging device, for example, one or more wide-angle camera(s), one or more fish-eye camera(s), one or more infrared camera(s), one or more thermal camera(s), and/or one or more camera(s) modified with a lens of a different focal length. In some arrangements, the camera(s) 26 can be part of a perception system typical of vehicles. Specifically, the camera(s) 26 can be included in the vehicle 200 as part of a panoramic view monitor (PVM) for adding driver visibility of the vehicle 200 and the exterior environment 240 of the vehicle 200.

The dual-sided display system 100 can include one or more gaze detectors 28, as noted above. The gaze detector(s) 28 can be located in the passenger compartment 220 of the vehicle 200. The gaze detector(s) 28 can be operatively connected to the processor(s) 36. The gaze detector(s) 28 can be configured to detect one or more characteristics and/or movements of the driver. For example, the gaze detector(s) 28 can detect movements of the driver's head and/or movements of the driver's eyes. Using this information, the gaze detector(s) 28 can determine the line of sight of the driver, for example, the direction in which the driver is looking, and/or the gaze detector(s) can determine if the driver moves his or her head to look toward a blind spot of the vehicle. The gaze detector(s) 28 can include any suitable technology, now known or later developed, configured to perform these processes. In some arrangements, the gaze detector(s) 28 can be part of driver monitoring systems typical of vehicles, for example, fatigue detection systems, security systems, etc.

As noted above, the dual-sided display system 100 can include one or more dual-sided transparent display(s) 30. The dual-sided transparent display(s) 30 can form at least a portion of the window(s) 50 of the vehicle 200. For example, a driver's side window 51 can include a driver's-side dual-sided transparent display 30' and a passenger's side window 52 can include a passenger's side dual-sided transparent display 30". While the dual-sided transparent displays 30 are described herein in connection with the driver's side window 51, the passenger's side window 52, it will be understood that the dual-sided transparent displays 30 can be used in connection with any other window of the vehicle 200, including the front windshield, the rear side windows and/or the rear windshield.

Referring to FIGS. 2A and 2B, the window(s) 50 can include an exterior side 50A and an interior side 50B. In some instances, the interior side 50B can be substantially parallel to the exterior side 50A. The exterior side 50A and/or the interior side 50B can include a surface of the window 50, for example, a surface of a glass pane. Alternatively, the exterior side 50A and/or the interior side 50B can be separate window components, for example, separate glass panes. The window(s) 50 can be made of any suitable material, now known or later developed. The window(s) 50 can have any suitable size, shape, and/or configuration. The window(s) 50 can include one or more layers.

The dual-sided transparent display(s) 30 can be configured to display exterior visual information 31 on the exterior side 50A of the window(s) 50. The exterior visual information 31 can be displayed to an adjacent entity 300 in the exterior environment 240 of the vehicle 200, as shown in FIG. 2. The exterior visual information 31 can include, for example, a blind spot warning, a turning warning, and/or a lane change warning, as will be described in further detail below with reference to FIGS. 2-4. The dual-sided transparent display(s) 30 can also be configured to display interior visual information 33 on the interior side 50B of the window(s) 50. The interior visual information 33 can be displayed to an occupant of the vehicle 200, for example, the driver of the vehicle 200. The interior visual information 33 can include the visual data captured by the camera(s) 26, and/or warnings and/or signals to the driver or another occupant of the vehicle 200.

In some arrangements, the dual-sided transparent display(s) 30 can be configured such that the exterior visual information 31 and the interior visual information 33 do not interfere with (e.g., occlude) each other. Accordingly, the exterior visual information 31 is not visible on the interior side 50B of the window(s) 50. Similarly, the interior visual information 33 is not visible on the exterior side 50A of the window(s) 50. In some arrangements, the dual-sided transparent display(s) 30 can be configured to display the interior visual information 33 and the exterior visual information 31 simultaneously. In other arrangements, the dual-sided transparent display(s) 30 can be configured to display the interior visual information 33 and the exterior visual information 31 at different times. Various embodiments of the dual-sided transparent display(s) 30 will be described in further detail below in connection with FIGS. 6-9.

As noted above, the dual-sided display system 100 can include one or more input interfaces 32. The term "input interface," as used herein, includes any device, component, system, element, or arrangement or groups thereof that enable information and/or data to be entered into a machine. The input interface(s) 32 can be located in the passenger compartment 220, for example, the input interface(s) 32 can be a component of the instrument panel. In some arrangements, the input interface(s) 32 can include the dual-sided transparent display(s) 30. The input interface(s) 32 can be any suitable input interface, including a keypad, display, touch screen, multi-touch screen, button, joystick, mouse, trackball, microphone, and/or any combination thereof. In some arrangements, the input interface(s) 32 can be an external device or can be communicatively coupled to an external device, which can be a device that is not a part of the vehicle and/or that can be readily moved into and out of the vehicle by a person. For example, the input interface(s) 32 can be a portable communication device or can be communicatively coupled to a portable communication device (e.g., smart phone, tablet, etc.) and/or an application installed on a portable communication device. The external device can be configured to send data to the dual-sided display system 100 in response to user inputs provided to the external device. The input interface(s) 32 can be configured to receive an input. For example, the input interface(s) 32 can receive an input from the driver to activate and/or deactivate one or more elements of the dual-sided display system 100, including the dual-sided transparent display(s) 30. In some arrangements, the input interface(s) 32 can include one or more graphical user interface elements. In one or more arrangements, the one or more graphical user interface elements can be presented, for example, on the dual-sided transparent display(s) 30 or on some other display within the passenger compartment 220.

The dual-sided display system 100 can include one or more output interfaces 34, as noted above. The term "output interface," as used herein, includes any device, component, system, element, or arrangement or groups thereof that enable information and/or data to be presented. The output interface(s) 34 can be located in the passenger compartment 220. In some arrangements, the output interface(s) 34 can include the dual-sided transparent display(s) 30. In other arrangements, the output interface(s) 34 can be any suitable output interface, including a display, touch screen, multi-touch screen, an earphone, a speaker, and/or any combination thereof. In some arrangements, the output interface(s) 34 can be an external device or can be communicatively coupled to an external device, which can be a device that is not a part of the vehicle and/or that can be readily moved into and out of the vehicle by a person. For example, the output interface(s) 34 can be a portable communication device or can be communicatively coupled to a portable communication device (e.g., smart phone, tablet, etc.) and/or an application installed on the portable communication device. The dual-sided display system 100 can be configured to send messages, alerts, or notifications to the portable communication device for display to a user. The output interface(s) 34 can be configured to receive data from one or more elements of the dual-sided display system 100, including the data store(s) 12, the sensor(s) 14, the gaze detector(s) 28, the processor(s) 36, and/or the module(s) 38. Specifically, the output interface(s) 34 can be configured to receive and display the visual data from the camera(s) 26.

The dual-sided display system 100 can include one or more processors 36, as noted above. As used herein, the term "processor" can mean any component or group of components that are configured to execute any of the processes described herein or any form of instructions to carry out such processes or cause such processes to be performed. The processor(s) 36 can be implemented with one or more general-purpose processor(s) and/or one or more special-purpose processor(s). Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 36 can include at least one hardware circuit (e.g., an integrated circuit) configured to carry out instructions contained in program code. In arrangements in which there is a plurality of processors, the processors can work independently from each other or one or more processors can work in combination with each other.

The processor(s) 36 can be configured to receive and/or access data from any of the elements in FIG. 1, including the data store(s) 12, the sensor(s) 14, and/or the gaze detector(s) 28. The processor(s) 36 can be configured to selectively cause the dual-sided transparent display(s) 30 to display the exterior visual information 31 on the exterior side 50A of the window(s) 50. The processor(s) 36 can also be configured to selectively cause the dual-sided transparent display(s) 30 to display the interior visual information 33 on the interior side 50B of the window(s) 50.

As noted above, the dual-sided display system 100 can include one or more module(s) 38. The module(s) 38 can be implemented as computer readable program code that, when executed by the processor(s) 36, implement one or more of the various processes described herein. The module(s) 38 can be a component of the processor(s) 36, or the module(s) 38 can be executed on and/or distributed among other processing systems to which the processor(s) 36 are operatively connected. The module(s) 38 can include instructions (e.g., program logic) executable by the processor(s) 36. Alternatively or additionally, the data store(s) 12 may contain such instructions. In one or more arrangements, the module(s) 38 described herein can include artificial or computational intelligence elements, e.g. neural network, fuzzy logic, or other machine learning algorithms. As noted above, the module(s) 38 can include one or more object detection modules 40, one or more object identification modules 42, one or more turning radius determination modules 46, one or more turn signal detection modules 44, and/or one or more display control modules 48. Each of these modules will be described in further detail in turn below.

The object detection module(s) 40 can be configured to detect the presence of an object in the exterior environment 240 of the vehicle 200. In some arrangements, the object can be the adjacent entity 300. As shown in FIG. 2, the adjacent entity 300 is a vehicle. However, the adjacent entity can be a pedestrian or a biker (e.g., motorcyclist, bicyclist, etc.) The object itself may not be directly detectable. The object detection module(s) 40 can detect the presence of an object in any suitable manner, such as by lidar, radar, vehicle communication, sonar, camera data, GPS data, position data, location data, and/or by using the map data 12M. In addition to detecting the presence of an object, the object detection module(s) 40 can be configured to determine a distance between the object and the vehicle 200. These characteristics can be determined in any suitable manner, such as by ranging sensors, radar, lidar, sonar, cameras (which can include visual or infrared cameras), by using the map data 12M, or any combinations of such techniques. In some arrangements, the object detection module(s) 40 can detect the presence of an object and the distance between the object and the vehicle using data from the sensor(s) 14 of the vehicle 200. Any suitable object detection technique, now known or later developed, can be used.

If the object detection module(s) 40 detects the presence of an object, the object identification module(s) 42 can be configured to determine the identity or nature of the object. In some arrangements, the object identification module(s) 42 can determine whether an object is an adjacent vehicle, pedestrian, or biker. The object identification module(s) 42 can determine the identity of an object in any suitable manner. In one or more arrangements, the detected object can be compared to identifying features of an object, such as color, shape, size, dimensions, movement, sounds, etc.

In one or more arrangements, the object identification module(s) 42 can compare acquired object data to object data for matches. For instance, in one or more arrangements, the object identification module(s) 42 can include and/or have access to an object image database. The objects image database can include one or more images of a plurality of different objects (e.g., vehicles, pedestrians, bikers, etc.). The images can be any object-relevant data obtained by a lidar sensor, a radar sensor, and/or a camera sensor. The images may be of one or more portions of the exterior of at least a portion of a plurality of different objects. For instance, the images can be of at least a portion of an object. The images can be provided in any suitable format. The object image database can be located on-board the vehicle 200, such as in the data store(s) 12, or it can be located in a source external to the vehicle 200 (e.g. in a cloud-based data store).

The object identification module(s) 42 can also include any suitable object recognition software. The object recognition software can analyze image(s) and/or video captured by the sensor(s) 14. The object recognition software can query the object image database for possible matches. For instance, images or video captured by the sensor(s) 14 can be compared to images in the object image database for possible matches. Additionally or alternatively, measurements or other aspects of an image captured by the sensor(s) 14 can be compared to measurements or other aspects of any images in the object image database. The object identification module(s) 42 can identify the detected object as a particular type of object if there is a match between the captured image and an image in the object database. "Match" or "matches" means that an image or other information collected by the sensor(s) 14 and one or more of the images in the object image database are substantially identical. For instance, an image or other information collected by the sensor(s) 14 and one or more of the images in the object image database can match within a predetermined probability (e.g., at least about 85%, at least about 90%, at least about 95% or greater) or confidence level.

As noted above, the dual-sided display system 100 can include one or more turning radius determination modules 46. The turning radius determination module(s) 46 can be configured to determine the turning radius of the vehicle 200. The turning radius determination module(s) 46 can be configured to determine the turning radius of the vehicle 200 in any suitable manner. For example, the turning radius determination module(s) 46 can use data from the vehicle sensors 16, including the steering wheel sensors 18 and/or the wheel sensors 20, data acquired or received by the navigation system 13 (e.g. GPS data), and/or map data 12M in order to calculate the turning radius of the vehicle 200. Moreover, the turning radius determination module(s) 46 can, in conjunction with the object detection module(s) 40 and the object identification module(s) 42, be configured to determine if a vehicle, a pedestrian, or a biker is located substantially within the turning radius of the vehicle 200.

As noted above, the dual-sided display system 100 can include one or more turn signal detection module(s) 44. The turn signal detection module(s) 44 can be configured to detect when a turn signal of the vehicle 200 is activated and/or deactivated. The turn signal detection module(s) 44 can detect when a turn signal of the vehicle 200 is activated and/or deactivated in any suitable manner. For example, the turn signal detection module(s) 44 can use data and/or information acquired by the turn signal sensor(s) 22.

In conjunction with the object detection module(s) 40, the turn signal detection module(s) 44 can be configured to determine if there is an adjacent entity on the side of the vehicle 200 that the turn signal indicates the vehicle 200 is turning. For example, if the turn signal detection module(s) 44 determines that the drivers' side turn signal of the vehicle 200 is activated, the object detection module(s) 40 can then determine if an adjacent entity is located on the driver's side of the vehicle 200, for example, in a blind spot on the driver's side of the vehicle 200.

The dual-sided display system 100 can include one or more display control module(s) 48, as noted above. The display control module(s) 48 can be configured to activate and/or deactivate the dual-sided transparent display(s) 30. Such activation and deactivation can be based on data acquired by the sensor(s) 14, and/or gaze detector(s) 28, and/or based on information acquired by and/or detected by the processor(s) 36.

For example, the processor(s) 36 can be configured to determine when an adjacent entity 300 is located in a blind spot of the vehicle 200 using the module(s) 38. If the processor(s) 36 determine that an adjacent entity 300 is located in a blind spot of the vehicle 200, the display control module(s) 48 can be configured to activate the dual-sided transparent display(s) 30. Activation of the dual-sided transparent display(s) 30 can include displaying the exterior visual information 31 and/or displaying the interior visual information 33. In this situation, the exterior visual information 31 can include a warning to the adjacent entity 300 that the adjacent entity 300 is located in a blind spot of the vehicle 200. The interior visual information 33 can include visual data acquired by the camera(s) 26 and/or a warning to the driver of the vehicle 200 that an adjacent entity 300 is located in a blind spot of the vehicle 200. In this way, a driver of the vehicle 200 is able to view the blind spot without having to turn his or her head toward the blind spot.

In another example, the processor(s) 36 can be configured to determine when the vehicle 200 is about to make a turn and if an adjacent entity 300 is located in the turning radius of the vehicle 200 using the object detection module(s) 40, the object identification module(s) 42, the turning radius determination module(s) 46, and/or the turn signal detection module(s) 44. If the processor(s) 36 determines that a turn signal of the vehicle 200 is activated and that an adjacent entity 300 is located substantially within the turning radius of the vehicle 200, the display control module(s) 48 can be configured to activate the dual-sided transparent display(s) 30.

Activation of the dual-sided transparent display(s) 30 can include displaying the exterior visual information 31 and/or displaying the interior visual information 33. In this situation, the exterior visual information 31 can include a warning to the adjacent entity that the vehicle 200 is turning. The interior visual information 33 can include visual data acquired by the camera(s) 26 and/or a warning to the driver of the vehicle 200 that an adjacent entity 300 is located in the turning radius of the vehicle 200. For example, if the processor(s) 36 determines that the driver's side turn signal of the vehicle 200 is activated and that an adjacent entity 300 is located in the turning radius of the vehicle 200 on the driver's side of the vehicle 200, the display control module(s) 48 can be configured to activate the dual-sided transparent display(s) 30 on the driver's side of the vehicle 200. Similarly, if the processor(s) 36 determines that the passenger's side turn signal of the vehicle 200 is activated and that an adjacent entity 300 is located in the turning radius of the vehicle 200 on the passenger's side of the vehicle 200, the display control module(s) 48 can be configured to activate the dual-sided transparent display(s) 30 on the passenger's side of the vehicle 200.

In another example, the processor(s) 36 and/or the gaze detector(s) 28 can be configured to determine when the driver of the vehicle 200 is looking toward a blind spot of the vehicle 200, as described above. If the processor(s) 36 and/or the gaze detector(s) 28 determine that the driver of the vehicle 200 is looking toward the blind spot, or turns his or her head toward the blind spot, the display control module(s) 48 can cause the dual-sided transparent display to display the interior visual information 33 on the interior side 50B of one or more of the window(s) 50. Moreover, the processor(s) 36 and/or the gaze detector(s) 28 can be configured to detect the line of sight of the driver, as described above. The display control module(s) 48 can be configured to cause the location of the interior visual information 33 to move based on the line of sight of the driver. For example, the display control module(s) 48 can be configured to keep the interior visual information 33 generally in line with the driver's line of sight.

In some arrangements, the display control module(s) 48 can activate or deactivate the dual-sided transparent display(s) 30 responsive to a user input or command. In some arrangements, the display control module(s) 48 can activate the dual-sided transparent display(s) 30 whenever the vehicle 200 is in use or is in motion. In some arrangements, the display control module(s) 48 can deactivate the dual-sided transparent display(s) 30 whenever the vehicle 200 is not in use or is not in motion.

Figure 3:
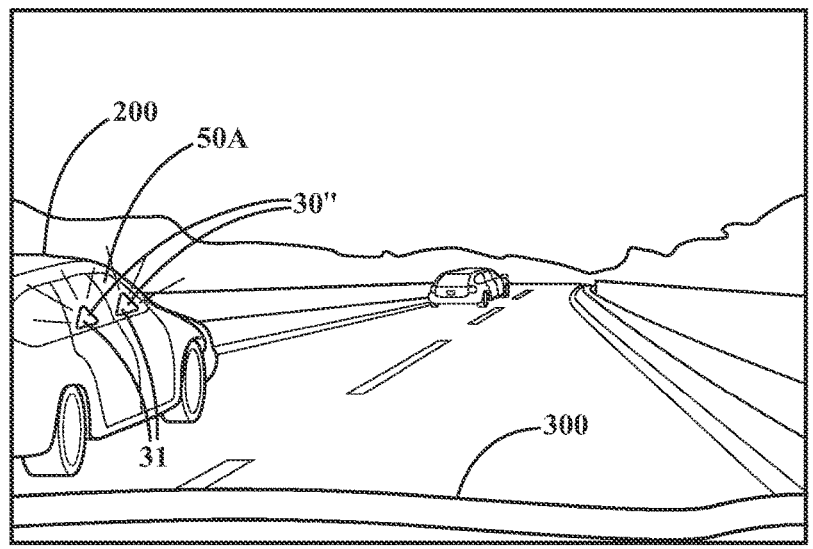
FIG. 3 is another example of a driving scenario, showing exterior visual information displayed by the dual-sided display system on the exterior side of the window of the vehicle.
Figure 4:
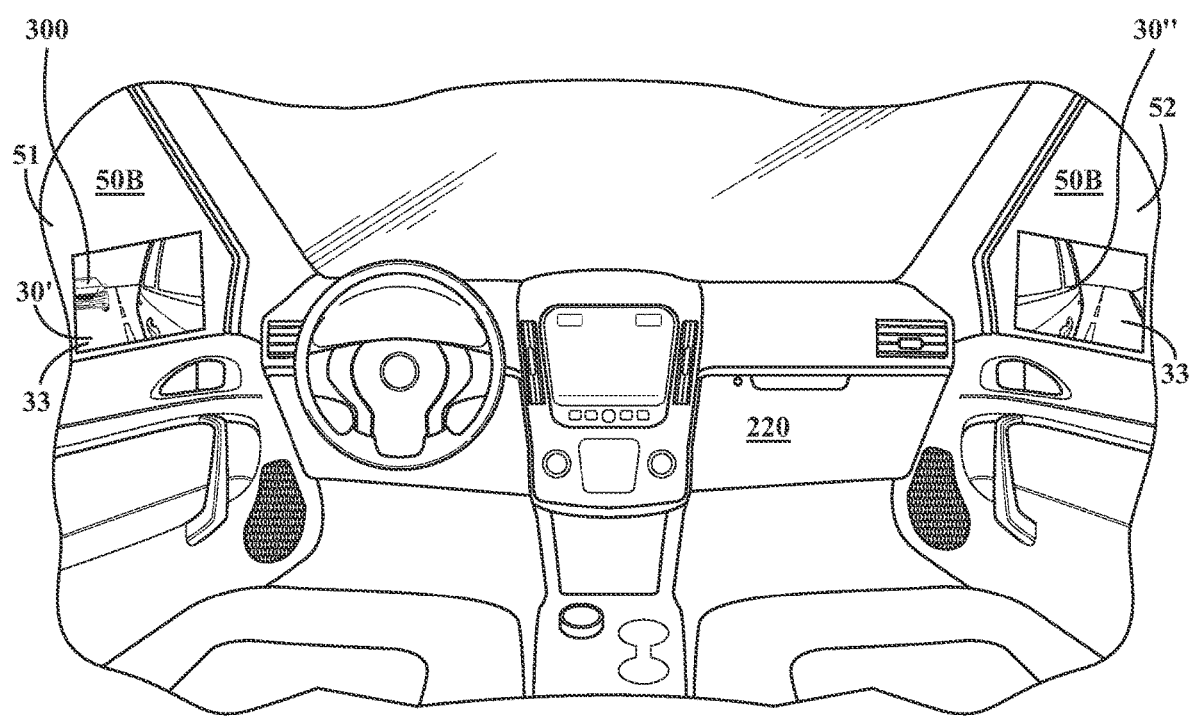
FIG. 4 is an example of an interior of the vehicle, showing interior visual information displayed by the dual-sided display system on an interior side of the window.

Referring now to FIGS. 2-4, some of these examples are shown. As shown in FIG. 2, the dual-sided display system 100 is configured to display the exterior visual information 31, using the dual-sided transparent display(s) 30, to an adjacent entity 300 located in a blind spot of the vehicle 200. As shown in FIG. 2, the adjacent entity 300 is an adjacent vehicle, however, the adjacent entity 300 can be an adjacent pedestrian, an adjacent biker, or other entity, as described above. While the exterior visual information 31 is shown to be displayed on the driver's side window 51 of the vehicle 200, the exterior visual information 31 can be shown on any suitable window.

As shown in FIG. 3, the exterior visual information 31 may be seen by an adjacent entity 300 traveling in the blind spot of the vehicle 200. From this vantage point, the adjacent entity 300 may not have good visibility of a rear turn signal of the vehicle 200. Accordingly, the dual-sided display system 100 can be configured to display the exterior visual information 31 to the adjacent entity using the dual-sided transparent display(s) 30. The exterior visual information 31 can be any suitable type of information, warning, and/or signal. The exterior visual information 31 can include words, pictures, and/or symbols that are suitable to indicate to the adjacent entity 300 that the adjacent entity 300 is traveling in the blind spot of the vehicle 200. The exterior visual information 31 can be displayed continuously while the adjacent entity 300 is located in the blind spot of the vehicle 200. Alternatively, the exterior visual information 31 can be displayed periodically, irregularly, or even randomly.

As shown in FIG. 4, the dual-sided display system 100 can be configured to display interior visual information 33, using the dual-sided transparent display(s) 30, to an occupant of the vehicle 200, for example, the driver of the vehicle 200. For example, if the processor(s) 36 and/or the module(s) 38 determine that an adjacent entity 300 is located in the blind spot of the vehicle 200, the dual-sided display system 100 can be configured to activate the dual-sided transparent display(s) 30 to display the interior visual information 33.

As shown in FIG. 4, the driver's side dual-sided transparent display 30' can display visual data of a driver's side blind spot of the vehicle 200. Similarly, the passenger's side dual-sided transparent display 30" can display visual data of a passenger's side blind spot of the vehicle 200. The dual-sided display system 100 can be configured to display the interior visual information 33 on one or both of the driver's side dual-sided transparent display 30' and the passenger's side dual-sided transparent display 30". In some arrangements, the dual-sided display system 100 can be configured to display the interior visual information 33 responsive to determinations by the processor(s) 36 and/or the module(s) 38. In another example, if the processor(s) 36 and/or the module(s) 38 determine that the driver of the vehicle 200 is looking toward a blind spot of the vehicle 200, the dual-sided display system 100 can be configured to activate the dual-sided transparent display(s) 30 to display the interior visual information 33. In some arrangements, the interior visual information 33 can include warnings and/or signals to an occupant of the vehicle 200. The interior visual information 33 can include words, pictures, and/or symbols that are suitable to indicate to an occupant of the vehicle 200 that an adjacent entity is traveling in the blind spot of the vehicle 200.

Now that the various potential systems, devices, elements and/or components of the dual-sided display system 100 have been described, various methods will now be described. Various possible steps of such methods will now be described. The methods described may be applicable to the arrangements described above in relation to FIGS. 1-4 as well as FIGS. 6-9 below, but it is understood that the methods can be carried out with other suitable systems and arrangements. Moreover, the methods may include other blocks that are not shown here, and in fact, the methods are not limited to including every block shown. The blocks that are illustrated here as part of the methods are not limited to the particular chronological order. Indeed, some of the blocks may be performed in a different order than what is shown and/or at least some of the blocks shown can occur simultaneously.

Referring now to FIG. 5, an example of a method 500 is shown. At block 510, exterior visual information 31 can be caused to be displayed on the exterior side 50A of a window 50 of a vehicle 200. The exterior visual information 31 can be a blind spot warning. The causing can be performed by the processor(s) 36 and/or the module(s) 38 (e.g., the display control module(s) 48). The method 500 can continue to block 510.

At block 510, interior visual information 33 can be caused to be displayed on the interior side 50B of a window 50 of a vehicle 200. The interior visual information 33 can include visual data of a blind spot of the vehicle 200. The causing can be performed by the processor(s) 36 and/or the module(s) 38 (e.g., the display control module(s) 48). The visual data can be acquired by the sensor(s) 14, such as the camera(s) 26. The method can then return to block 510 or proceed to some other block.

Referring now to FIGS. 6-9, three embodiments of the dual-sided transparent display 30 are shown. In some arrangements, the dual-sided transparent display 30 is a dual-sided transparent display panel 30. The embodiments described below overcome three significant shortcomings of conventional dual-sided display panels, which are described below.

First, in some implementations, a user looking at one side of the display, in addition to seeing an image intended for him or her, can also see an image intended for a user on the opposite side of the display, and the two images may overlap and interfere with each other, impairing the clarity of the intended image. This is sometimes referred to as the "occlusion" problem. Second, in some implementations, a user looking at one side of the display, in addition to seeing an image intended for him or her, can also see a backward (horizontally flipped) image intended for a user on the opposite side of the display, causing distraction or confusion, whether the reversed image overlaps with the intended image or not. This is sometimes referred to as the "obversion" problem. Third, in some implementations, light is intentionally blocked between the two sides of the display to avoid occlusion and obversion, resulting in a dark region delineating an image intended for a user on either side of the display. This is sometimes referred to as the "obstruction" problem.

Various embodiments described herein can provide a true dual-sided transparent display panel. One principle underlying the embodiments described herein is that light propagating through a waveguide becomes visible only when it is scattered (e.g., refracted). This principle is employed in conjunction with an edge-lighted design to provide a dual-sided transparent display panel that displays images independently on both sides of the display panel without occlusion, obversion, or obstruction. That is, a user on one side of the transparent display can view an image intended for him or her at the same time another user on the opposite side of the transparent display views an image intended for that other user, and neither user sees the image (reversed or otherwise) intended for the user on the opposite side. Instead, the portions of the display panel not containing an image intended for a user looking at the applicable side of the display panel appear transparent to that user, and the same applies to a user looking at the opposite side of the display panel.

FIG. 6 is a cross-sectional diagram a first embodiment of a dual-sided transparent display panel 30. This embodiment includes a first layer of electro-optic material 605a and a second layer of electro-optic material 605b, each of which has an inner surface (the surface closest to the axis of symmetry of the waveguide 610) and an outer surface (the surface farthest from the axis of symmetry just mentioned). As shown in FIG. 6, waveguide 610 is disposed between the inner surface of the first layer of electro-optic material 605a and the inner surface of the second layer of electro-optic material 605b. In some embodiments, waveguide 610 is made of glass.

Dual-sided transparent display panel 30 also includes a first grating coating 615a adjacent to the outer surface of the first layer of electro-optic material 605a and a second grating coating 615b adjacent to the outer surface of the second layer of electro-optic material 605b. In one embodiment, the first and second grating coatings (615a and 615b) are periodic grating coatings that include alternating diffusive and plain-glass regions.

Dual-sided transparent display panel 30 also includes light sources 625 along an edge of waveguide 610 that is perpendicular to the inner and outer surfaces of the first and second layers of electro-optic material (605a and 605b). In this embodiment, the light sources include red, green, and blue light sources in accordance with the RGB standard. In some embodiments, the light sources 625 are lasers. In other embodiments, the light sources 625 are light-emitting diodes (LEDs). In one embodiment, the LEDs are Micro-LEDs. In the coordinate system shown in FIG. 6, the light sources 625 are disposed along an edge of waveguide 610 that runs in the y direction (into and out of the page) and faces the negative z direction. In the embodiment shown in FIG. 6, dual-sided transparent display panel 30 is thus edge-lighted by light sources 625.

As diagramed in FIG. 6, light emitted from light sources 625 propagates along waveguide 610 in the z direction. In this embodiment, the first layer of electro-optic material 605a and the second layer of electro-optic material 605b can be, for example, an active liquid-crystal matrix or, in a different embodiment, a passive liquid-crystal matrix. In one embodiment, the first and second layers of electro-optic material (605a and 605b) are thin-film-transistor (TFT) liquid-crystal matrices.

As those skilled in the art are aware, a liquid-crystal matrix is a special type of material that has two different refractive indices, $n_e$ (extraordinary) and $n_o$ (ordinary), depending on the electro-optical state of the material. In response to electrical control (e.g., a voltage) from driver circuitry (not shown in FIG. 6), the molecules of a liquid-crystal matrix can be caused to orient themselves in an "off" state or an "on" state. In FIG. 6, the vertical lines in first layer of electro-optic material 605a and second layer of electro-optic material 605b delineate the boundaries of rows or columns of pixels (in the y direction) in dual-sided transparent display panel 30.

Refer to the legend in FIG. 6 for the "on" and "off" states. Pixels with molecules oriented in the "off" (reflective) state 645 cause light such as the blue light 630 to be totally internally reflected within waveguide 610. The concept of total internal reflection (TIR) is well known in the waveguide-related art. As shown in FIG. 6, the oblong-shaped molecules oriented in the "off" state (645) are oriented substantially parallel to the z-axis (parallel to the direction in which light propagates within waveguide 610). Thus, a viewer looking at one of the sides of the dual-sided transparent display panel 30 in the positive or negative x direction would not see the blue light 630 at those pixel positions. A viewer looking at the waveguide cannot see the light traveling in the waveguide, but the liquid crystal can change the refractive index and thus help commute scattering. Pixels with molecules oriented in the "on" (transmissive) state 640, on the other hand, are oriented at an angle relative to the z-axis, permitting light to exit waveguide 610, the blue light 630 mentioned earlier being diffused by first grating coating 615a to produce diffused and emitted blue light 635 that is visible to a user looking at dual-sided transparent display panel 30 in the negative x direction. As those skilled in the art will recognize, the individual pixels can be controlled (i.e., placed in the "on" or "off" state) using the driver circuitry mentioned above. Importantly, this can be done independently for the two sides of dual-sided transparent display panel 30 (the side facing the positive x direction and the side facing the negative x direction) to permit different images to be displayed on the two opposite sides of dual-sided transparent display panel 30 simultaneously.

As shown in FIG. 6, dual-sided transparent display panel 30 also includes first light-blocking element 620a and second light-blocking element 620b. These light-blocking elements prevent light from leaking in the x direction from a predetermined portion (e.g., a rectangular strip) of dual-sided transparent display panel 30 adjacent to the edge of waveguide 610 (the perpendicular edge mentioned above) along which light sources 625 edge-light the display panel. In other words, the light-blocking elements 620a and 620b block light that is not totally internally reflected near the edge of the waveguide 610 closest to the light sources 625. In variations of the first embodiment (the embodiment shown in FIG. 6), a different type of electro-optic material other than a liquid-crystal matrix can be used.

Figure 7A:
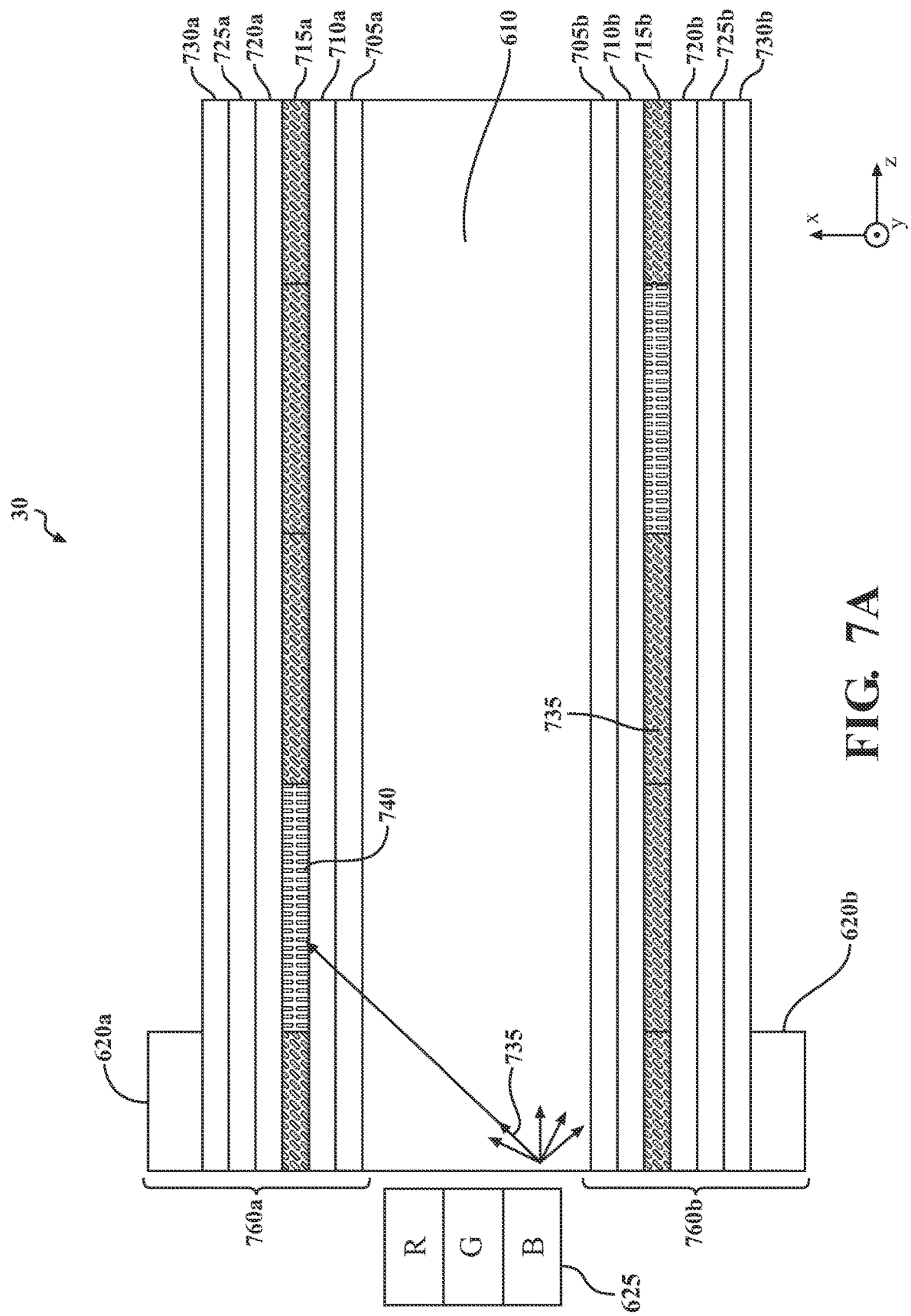
FIGS. 7A and 7B are an example of a second embodiment of a dual-sided transparent display that can be used in connection with the dual-sided display system.

FIG. 7A is a cross-sectional diagram of a second embodiment of a dual-sided transparent display panel 30 in an illustrative molecular configuration of the liquid-crystal matrices. In this embodiment, the first and second grating coatings 615a and 615b in the embodiment of FIG. 6 are omitted, and other layers are added to each side of the overall display panel. In this embodiment, the liquid-crystal matrices themselves are capable of scattering/diffusing light, eliminating the need for the grating coatings.

The two sides of dual-sided transparent display panel 30 may be thought of as separate panel subassemblies. A first panel subassembly 760a of dual-sided transparent display panel 30 includes a plurality of adjacent layers. Those layers, moving from the innermost layer to the outermost layer (relative to the axis of symmetry of waveguide 610) include a first electrode layer 705a, a first polyimide layer 710a, a liquid-crystal matrix 715a, a second polyimide layer 720a, a second electrode layer 725a, and a glass layer 730a. The polyimide layers (710a and 720a) are used to place the liquid-crystal molecules in the desired orientation, when they are in their passive (default) state. The specific orientations of the molecules are discussed in greater detail below. In some embodiments, the electrode layers (705a, 725a) include Indium Tin Oxide (ITO).

A second panel subassembly 760b of dual-sided transparent display panel 30 includes a plurality of adjacent layers that correspond to those in the first panel subassembly 760a. Those layers, moving from the innermost layer to the outermost layer (relative to the axis of symmetry of waveguide 610), include a first electrode layer 705b, a first polyimide layer 710b; a liquid-crystal matrix 715b; a second polyimide layer 720b; a second electrode layer 725b, and a glass layer 730b. As mentioned above, in some embodiments, the electrode layers (705b, 725b) include Indium Tin Oxide (ITO).

In this embodiment, a waveguide 610 is disposed between the inner surface of the first electrode layer 705a of the first panel subassembly 760a and the inner surface of the first electrode layer 705b of the second panel subassembly 760b. In some embodiments, waveguide 610 is made of glass, as in the embodiment shown in FIG. 6.

Dual-sided transparent display panel 30 also includes light sources 625 along an edge of waveguide 610 that is perpendicular to the inner surface of the first electrode layer 705a of the first panel subassembly 760a and the inner surface of the first electrode layer 705b of the second panel subassembly 760b. In this embodiment, the light sources include RGB light sources. In some embodiments, the light sources 625 are lasers. In other embodiments, the light sources 625 are light-emitting diodes (LEDs). In the coordinate system shown in FIG. 7A, the light sources 625 are disposed along an edge of waveguide 610 that runs in they direction (into and out of the page) and faces the negative z direction. In the embodiment shown in FIG. 7A, dual-sided transparent display panel 30 is thus edge-lighted by light sources 625.

In some embodiments, the liquid-crystal matrix in each of the panel subassemblies (760a and 760b) includes nematic liquid crystals. Refer to the legend for the "on" and "off" states in FIG. 7A. As depicted in FIG. 7A, the oblong-shaped molecules making up the nematic liquid crystals can be oriented at an angle (less than 90 degrees) relative to the positive z-axis, when in the passive or "off" state (see molecules oriented in the "off" state 745 in FIG. 7A). When the oblong-shaped molecules are in the "on" state, they are aligned approximately perpendicularly to waveguide 610 (see molecules oriented in the "on" state 740 in FIG. 3A). In the illustrative configuration of the molecules depicted in FIG. 7A, blue light 735 reaches a pixel for which the molecules are in the "on" state (740), which permits the blue light 735 to exit the first panel subassembly 760a in the positive x direction, making it visible to a user gazing toward dual-sided transparent display panel 30 in the negative x direction.

As shown in FIG. 7A, dual-sided transparent display panel 30 also includes first light-blocking element 620a and second light-blocking element 620b. These light-blocking elements prevent light from leaking in the x direction from a predetermined portion (e.g., a rectangular strip) of dual-sided transparent display panel 30 adjacent to the edge of waveguide 610 that is perpendicular to the inner surface of the first electrode layer 705a of the first panel subassembly 760a and the inner surface of the first electrode layer 705b of the second panel subassembly 760b— the edge of waveguide 610 along which light sources 625 edge-light the display panel. In other words, the light-blocking elements 620a and 620b block light that is not totally internally reflected near the edge of the waveguide 610 closest to the light sources 625.

Figure 7B:
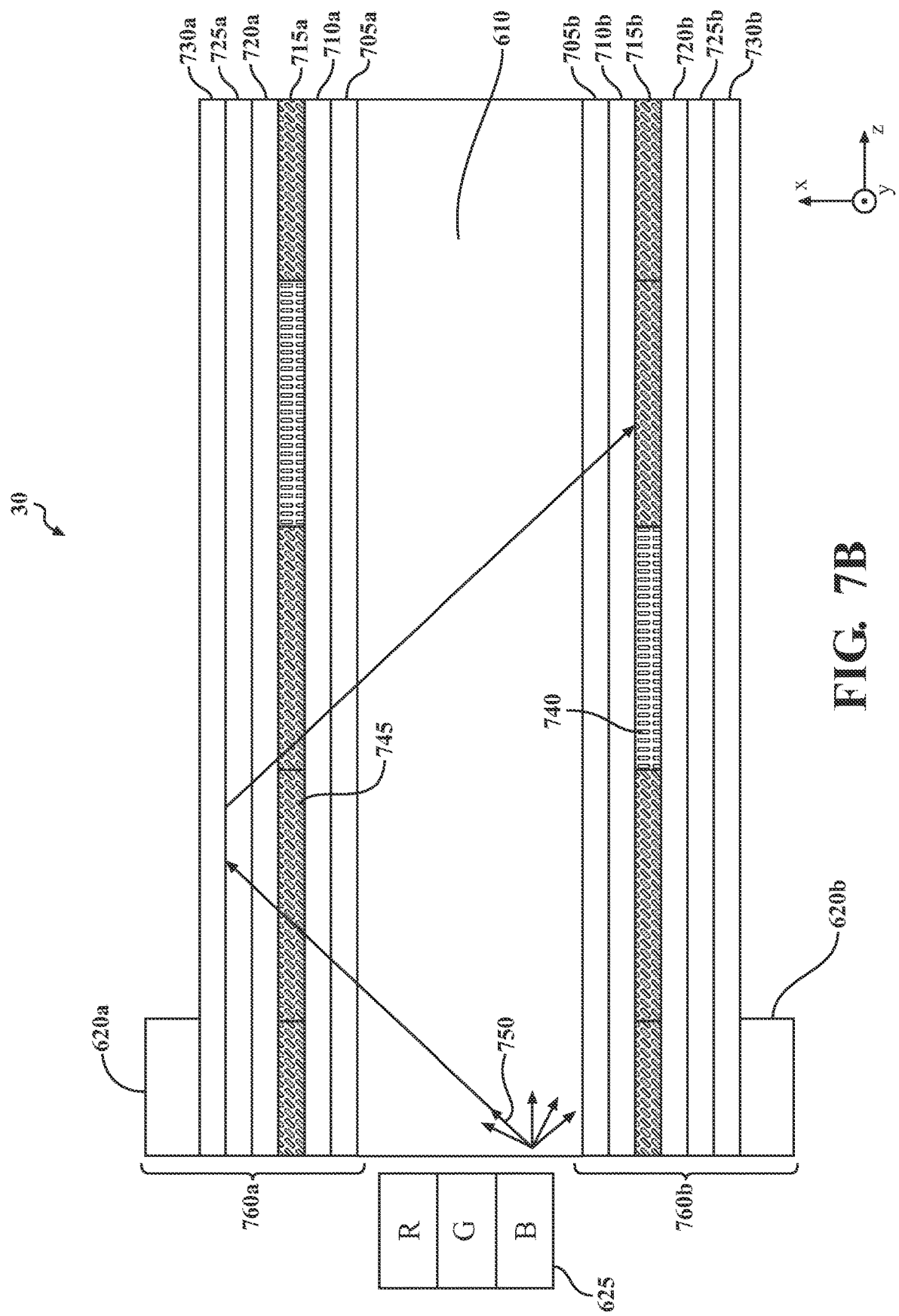

FIG. 7B is a cross-sectional diagram of a second embodiment of a dual-sided transparent display panel 30 in another illustrative molecular configuration of the liquid-crystal matrices. Refer to the legend for the "on" and "off" states in FIG. 7B. In this example, green light 750 encounters molecules in the liquid-crystal matrix 715a of the first panel subassembly 760a that are oriented in the "off" state (see molecules oriented in "off" state 745 in FIG. 3B). The orientation of those molecules (745) permits the green light 750 to propagate beyond liquid-crystal matrix 715a but causes the green light 750 to nevertheless be reflected within first panel subassembly 760a as if the dimensions of waveguide 610 were effectively expanded to encompass, e.g., the glass layer 730a of first panel subassembly 760a, as depicted in FIG. 3B. Thus, the molecules in a given panel subassembly (760a or 760b) that are oriented in the "off" state cause light from light sources 625 to be reflected by that panel subassembly toward the waveguide 610 instead of exiting that panel subassembly.

Before discussing a third embodiment of a dual-sided transparent display panel shown in FIG. 9, FIGS. 8A and 8B will be discussed to introduce some of the important principles underlying the embodiment in FIG. 9. FIG. 8A is a diagram of beam splitting using circular polarization when the molecules of a liquid-crystal substance are oriented in an "off" state, in connection with a third embodiment of a dual-sided transparent display panel. In FIG. 8A, light with two opposite circular polarizations, counterclockwise-polarized light 820 and clockwise-polarized light 825, enters a nematic liquid-crystal substance 805. In FIG. 8A, the molecules 810 are oriented in the "off" state. This causes the counterclockwise-polarized light 820 to be diverted in the negative x direction (directed light 830) and the clockwise-polarized light 825 to be diverted in the opposite (positive x) direction (directed light 835). With the molecules in this "off" configuration and the incoming light being polarized in opposite senses (clockwise and counterclockwise or right-handed and left-handed, respectively), the nematic liquid-crystal substance 805 effectively acts as a beam splitter to direct light toward the separate sides of a dual-sided transparent display panel, depending on how the incoming light is polarized. In other words, an arrangement such as that shown in FIG. 8A exploits the chirality (or handedness) of the liquid-crystal molecules' effect on circularly polarized light, when the molecules are oriented in the "off" state.

FIG. 8B is a diagram of light passing through a liquid-crystal substance when the molecules are in an orientation corresponding to an "on" state, in connection with a third embodiment of a dual-sided transparent display panel. As shown in FIG. 8B, entering light 840 passes through nematic liquid-crystal substance 805 (see exiting light 845 in FIG. 8B) without being diverted by molecules 815 that are oriented in the "on" state. Such light will not be visible to a user looking at either side of the dual-sided transparent display panel.

FIG. 9 is a cross-sectional diagram of a third embodiment of a dual-sided transparent display panel 30. A first panel subassembly 935a of dual-sided transparent display panel 30 includes a plurality of adjacent layers. Those layers, moving from the innermost layer to the outermost layer (relative to the axis of symmetry of a nematic liquid-crystal layer 920 that acts as a waveguide) include a polyimide alignment layer 905a, an electrode layer 910a, and a glass layer 915a.

A second panel subassembly 935b of dual-sided transparent display panel 30 includes a plurality of layers that correspond to those in first panel subassembly 935a. Those layers, moving from the innermost layer to the outermost layer (relative to the axis of symmetry of nematic liquid-crystal layer 920) include a polyimide alignment layer 905b, an electrode layer 910b, and a glass layer 915b. In some embodiments, the electrode layers (910a and 910b) in the two panel subassemblies include Indium Tin Oxide (ITO).

As shown in FIG. 9, nematic liquid-crystal layer 920 is disposed between the inner surface of the polyimide alignment layer 905a of the first panel subassembly 935a and the inner surface of the polyimide alignment layer 905b of the second panel subassembly 935b. In a different embodiment, cholesteric liquid crystals are used instead of nematic liquid crystals. As discussed above, this layer acts as a waveguide with reorientable molecules within it (refer to the discussion of FIGS. 8A and 8B above) that direct, toward the glass layer 915a of the first panel subassembly 935a, light 925 from one or more light sources that is circularly polarized in a first sense and that direct, toward the glass layer 915b of the second panel subassembly, light 925 that is circularly polarized in a second sense that is opposite the first sense. As discussed above, the two opposite senses for circular polarization are clockwise and counterclockwise (also sometimes called right-handed and left-handed circular polarization, respectively). Though not shown in FIG. 9, the light sources for edge-lighting of the dual-sided transparent display panel can be similar, in this embodiment, to those discussed above in connection with FIGS. 6, 7A, and 7B (the first and second embodiments). In some variations of the embodiment shown in FIG. 9, a different type of liquid-crystal layer other than a nematic liquid-crystal layer can be employed.

In the embodiment shown in FIG. 9, the nematic liquid-crystal layer 920 acts as a waveguide containing reorientable molecules that, in the "off" state, can divert light to a specific one of the two sides of a dual-sided transparent display panel, depending on the sense of the entering circularly polarized light. The driver circuitry, in this embodiment, can control both the state ("on" or "off") of the molecules associated with individual pixels and the polarization of the light emitted at the edge of nematic liquid-crystal layer 920 from one or more light sources, such as the light sources 625 shown in FIGS. 6, 7A, and 7B. In some embodiments, a single light emitter is used, and the polarization is switched as needed over time to support a dual-sided transparent display panel, but in other embodiments, two emitters (one for each side of the dual-sided transparent display panel) are used. Some possible methods to switch polarizations could include photo elastic modulators, variable retarders (also known as variable wave plates), or fast-switching wave plates. In some embodiments, use can be made of diodes that emit circular polarizations from the light source itself.

In the various embodiments discussed above, the refresh cycle of a typical liquid-crystal matrix can be reduced by a factor of three in order to account for the different colors emitted by the light sources 625. Mixed colors or multiple colors can be emitted by overlapping the time frames of how long the liquid-crystal matrix is open. One possible order is R, then G, then B. A purple pixel can be created, for example, by mixing red and blue light. Therefore, the length of time the pixel is "scattering light to a viewer/user" will vary the hue of the purple color. To mix red and blue evenly, the activation time should be equal for the two colors. Also, different types of liquid crystals can be used, depending on the particular embodiment, to achieve different effects. Cholesteric liquid crystals can be used to change the refractive index. This abrupt change in refractive index can cause deflection or scattering out of the flat display panel because of its poly-domain structure.

Further, it will be appreciated that the above-described embodiments of the dual-sided transparent display are not the only configurations that can be used. Indeed, additional examples of the dual-sided transparent display can include any of those disclosed in U.S. patent application Ser. No. 16/897,577 which is incorporated herein by reference in its entirety.

It will be appreciated that arrangements described herein can provide numerous benefits, including one or more of the benefits mentioned herein. For example, the arrangements described herein can provide a dual-sided display system for a window of a vehicle for displaying warnings and/or signals to an adjacent entity near a vehicle as well as warnings and/or signals to a driver or other occupant of the vehicle. The warnings and/or signals can indicate to the adjacent entity that the adjacent entity is located in a blind spot of the vehicle, and the warnings and/or signals can indicate to a driver or other occupant of the vehicle that an adjacent entity is located in a blind spot of the vehicle. Moreover, the arrangements described herein can allow the driver to view the blind spot(s) of the vehicle without turning his or her head. The arrangements described herein can thus improve the driver's visibility of the exterior environment of the vehicle, and create a safer driving environment for the driver and adjacent entities near the vehicle. The arrangements described herein can be implemented without affecting visibility through the window.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the function(s) noted in the block diagrams may occur out of the order noted in the figures. For example, two blocks shown in succession may, in fact, be executed substantially concurrently, or the blocks may sometimes be executed in the reverse order, depending on the functionality involved.

The systems, components, and/or processes described above can be realized in hardware or a combination of hardware and software and can be realized in a centralized fashion in one processing system or in a distrusted fashion where different elements are spread across several interconnected processing systems. Any kind of processing system or other apparatus adapted for carrying out the methods described herein is suitable. A typical combination of hardware and software can be a processing system with computer-useable program code that, when being loaded and executed, controls the processing system such that it carries out the methods described herein. The systems, components, and/or processes can also be embedded in a computer-readable storage, such as a computer program product or other data programs storage device, readable by a machine, tangibly embodying a program of instructions executable by the machine to perform methods and processes described herein. These elements can also be embedded in an application product which comprises all the features enabling the implementation of the methods described herein and which, when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ," as used herein refers to and encompasses any and all possible combinations of one or more of the associated listed items. As an example, the phrase "at least one of A, B, and C" includes A only, B only, C only, or any combination thereof (e.g. AB, AC, BC, or ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/ units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some examples, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle, comprising:
 a window including an interior side and an exterior side;
 a camera operatively positioned to capture visual data of a blind spot of an exterior environment of the vehicle;
 a dual-sided transparent display forming at least a portion of the window and including:
  a waveguide;
  layers of electro-optic material disposed exterior to the waveguide, the layers of electro-optic material being liquid crystal matrix; and
  grating coatings disposed exterior to the layers of electro-optic material and the waveguide; and
 a processor operatively connected to the camera and the dual-sided transparent display and configured to:
  selectively cause the dual-sided transparent display to display, on the exterior side, exterior visual information; and
  selectively cause the dual-sided transparent display to simultaneously display, on the interior side, interior visual information including the visual data captured by the camera of the blind spot of the vehicle, wherein, when the exterior visual information and interior visual information are simultaneously displayed on overlapping areas of opposite sides of the window, the interior visual information is not visible on the exterior side, the exterior visual information is not visible on the interior side, and the interior visual information and the exterior visual information are displayed independently without occlusion.

2. The vehicle of claim 1, wherein the visual data includes continuous, real-time video data.

3. The vehicle of claim 1, further comprising:
 at least one sensor located on an exterior of the vehicle, wherein the at least one sensor is operatively connected to the processor, wherein the at least one sensor is configured to acquire environment data, and wherein the processor is further configured to detect, using the environment data, an adjacent entity located in at least one of the blind spot of the vehicle and a turning radius of the vehicle.

4. The vehicle of claim 3, wherein at least one of selectively cause the dual-sided transparent display to display exterior visual information on the exterior side and selectively cause the dual-sided transparent display to display interior visual information on the interior side is responsive to detecting the adjacent entity located in at least one of the blind spot of the vehicle and a turning radius of the vehicle.

5. The vehicle of claim 3, wherein the adjacent entity is at least one of an adjacent vehicle, an adjacent pedestrian, and an adjacent biker.

6. The vehicle of claim 1, wherein the exterior visual information is at least one of a blind spot warning, a turning warning, and a lane change warning.

7. The vehicle of claim 1, wherein the processor is further configured to:
 detect an activation of a turn signal of the vehicle,
 wherein at least one of selectively cause the dual-sided transparent display to display exterior visual information on the exterior side and selectively cause the dual-sided transparent display to display interior visual information on the interior side is responsive to detecting the activation of the turn signal of the vehicle.

8. The vehicle of claim 1, further comprising:
 a gaze detector located in a passenger compartment of the vehicle, wherein the gaze detector is operatively connected to the processor, wherein the gaze detector is configured to detect when a driver of the vehicle is looking toward the blind spot, and wherein at least one of selectively cause the dual-sided transparent display to display exterior visual information on the exterior side and selectively cause the dual-sided transparent display to display interior visual information on the interior side is responsive to the gaze detector detecting that the driver is looking toward the blind spot.

9. The vehicle of claim 1, further comprising:
 a gaze detector located in a passenger compartment of the vehicle, wherein the gaze detector is operatively connected to the processor, wherein the gaze detector is configured to detect a line of sight of a driver, and wherein the processor is configured to cause a location of the interior visual information displayed on the dual-sided transparent display to move based on the line of sight of the driver.

10. The vehicle of claim 1, further comprising:
 at least one side view mirror located on an exterior of the vehicle.

11. The vehicle of claim 1, wherein the window is a driver's side window, wherein the camera is a first camera operatively positioned to capture visual data of a driver's side blind spot of the exterior environment of the vehicle, wherein the dual-sided transparent display is a first dual-sided transparent display forming at least a portion of the driver's side window, wherein the processor is configured to:
 selectively cause the dual-sided transparent display to display driver's side exterior visual information on the exterior side; and
 selectively cause the dual-sided transparent display to display driver's side interior visual information on the interior side, wherein the driver's side interior visual information includes the visual data of the driver's side blind spot.

12. The vehicle of claim 11, further comprising:
 a passenger's side window including an interior side and an exterior side;
 a second camera operatively positioned to capture visual data of a passenger's side blind spot of the exterior environment of the vehicle; and
 a second dual-sided transparent display forming at least a portion of the passenger's side window, wherein the second camera and the second dual-sided transparent display are operatively connected to the processor, wherein the processor is further configured to:
  selectively cause the dual-sided transparent display to display passenger's side exterior visual information on the exterior side; and
  selectively cause the dual-sided transparent display to display passenger's side interior visual information on the interior side, the interior visual information including the visual data of the blind spot of the vehicle.

13. A method for a vehicle, the vehicle including a window, the window including an interior side and an exterior side, a camera operatively positioned to capture visual data of a blind spot of an external environment of the vehicle, and a dual-sided transparent display forming at least a portion of the window and including a waveguide, layers of electro-optic material disposed exterior to the waveguide, the layers of electro-optic material being liquid crystal matrix, and grating coatings disposed exterior to the layers of electro-optic material, the method comprising:
   causing exterior visual information to be displayed on the exterior side, the exterior visual information including a blind spot warning; and
   causing interior visual information to be displayed on the interior side, the interior visual information including the visual data captured by the camera of the blind spot of the vehicle, wherein, when the exterior visual information and interior visual information are simultaneously displayed on overlapping areas of opposite sides of the window, the interior visual information is not visible on the exterior side, and the exterior visual information is not visible on the interior side, and the interior visual information and the exterior visual information are displayed independently without occlusion.

14. The method of claim 13, further comprising:
   detecting a use of a turn signal of the vehicle, wherein causing the exterior visual information to be displayed on the exterior side is responsive to detecting the use of the turn signal of the vehicle.

15. The method of claim 13, further comprising:
   detecting an adjacent entity located in a blind spot of the vehicle, wherein causing the exterior visual information to be displayed on the exterior side is responsive to detecting the adjacent entity located the blind spot of the vehicle.

16. The method of claim 13 further comprising:
   detecting an adjacent entity located in a turning radius of the vehicle, wherein causing the exterior visual information to be displayed on the exterior side is responsive to detecting the adjacent entity located in the turning radius of the vehicle.

17. The vehicle of claim 1, wherein the layers of electro-optic material include a first layer of electro-optic material and a second layer of electro-optic material, and further comprising:
   a light source disposed along an edge of the waveguide that is perpendicular to the layers of electro-optic material; and
   a light-blocking element disposed on an outer surface of one of the grating coatings to prevent light from the light source from leaking from a predetermined portion of the dual-sided transparent display adjacent to the edge of the waveguide.

18. The vehicle of claim 1, further comprising a light source disposed along an edge of the waveguide that is perpendicular to the layers of electro-optic material, and wherein the layers of electro-optic material include a plurality of molecules, the plurality of molecules, in a first orientation, causing light from the light source to be reflected within the waveguide, and the plurality of molecules, in a second orientation, permitting light from the light source to exit the waveguide.

* * * * *